Jan. 18, 1944.   C. L. PAULUS ET AL   2,339,291
AUTOMATIC STEERING MECHANISM
Filed April 22, 1940   4 Sheets-Sheet 4
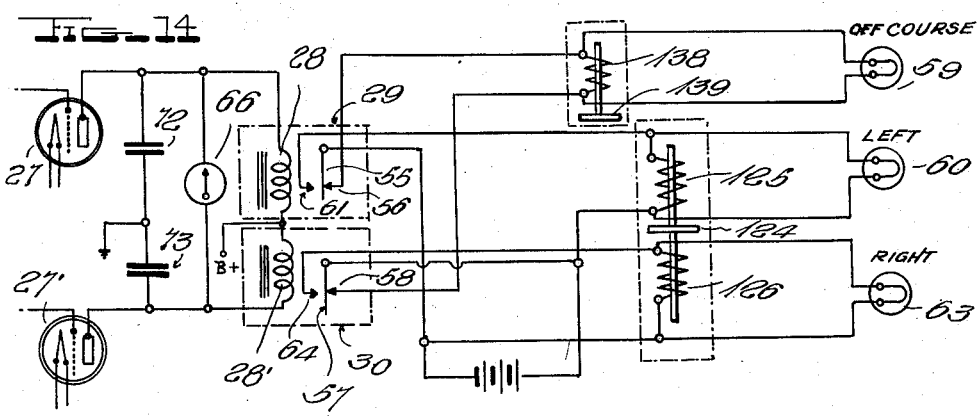
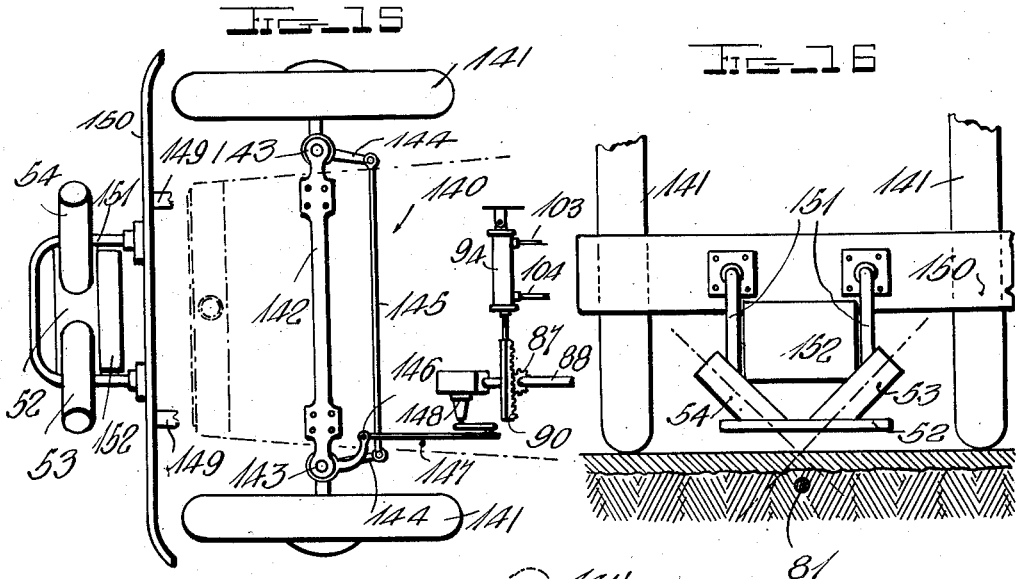
INVENTORS
Charles L. Paulus
Raymond K. Stout
BY
John C. Brady
Attorney Patented Jan. 18, 1944

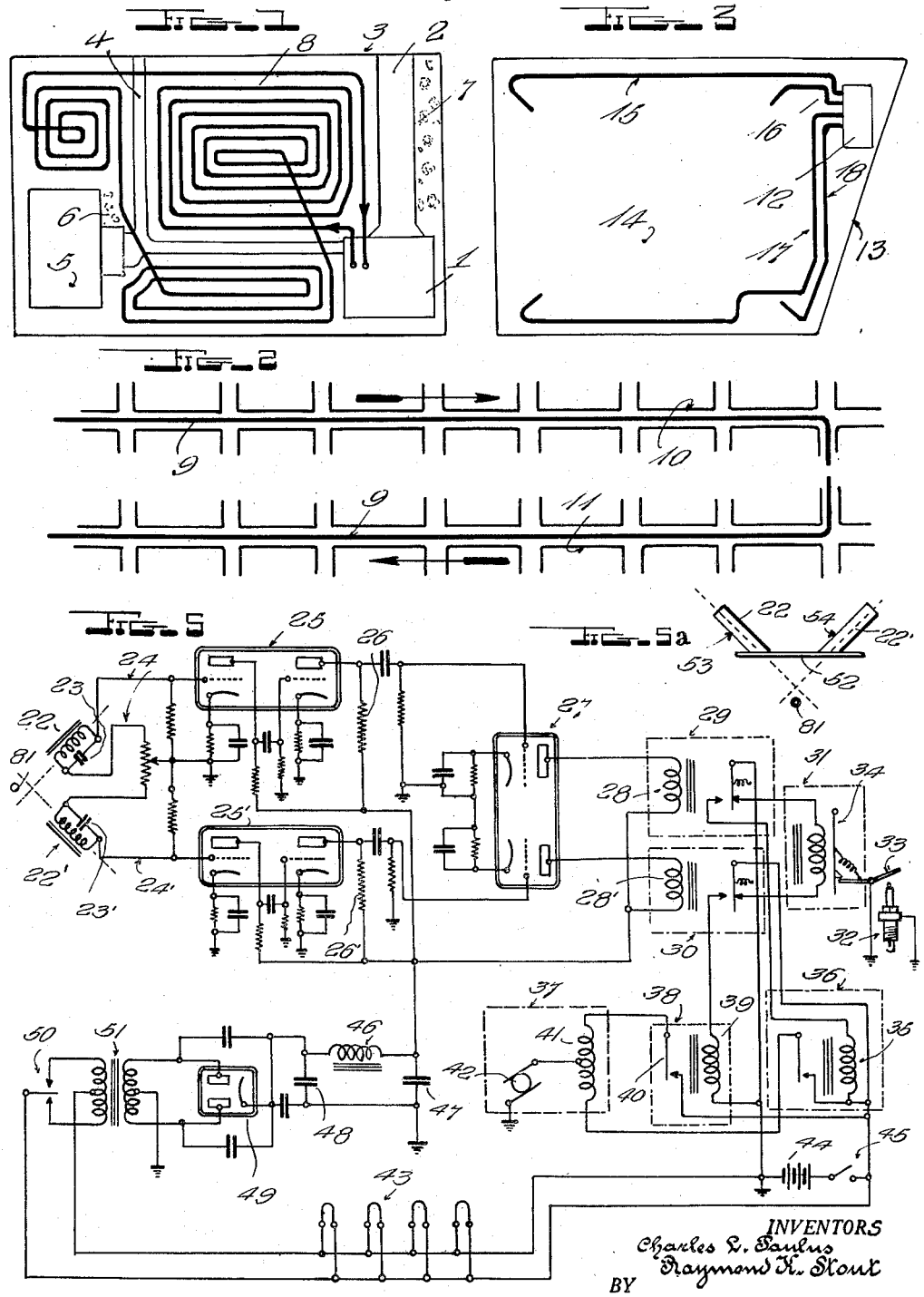

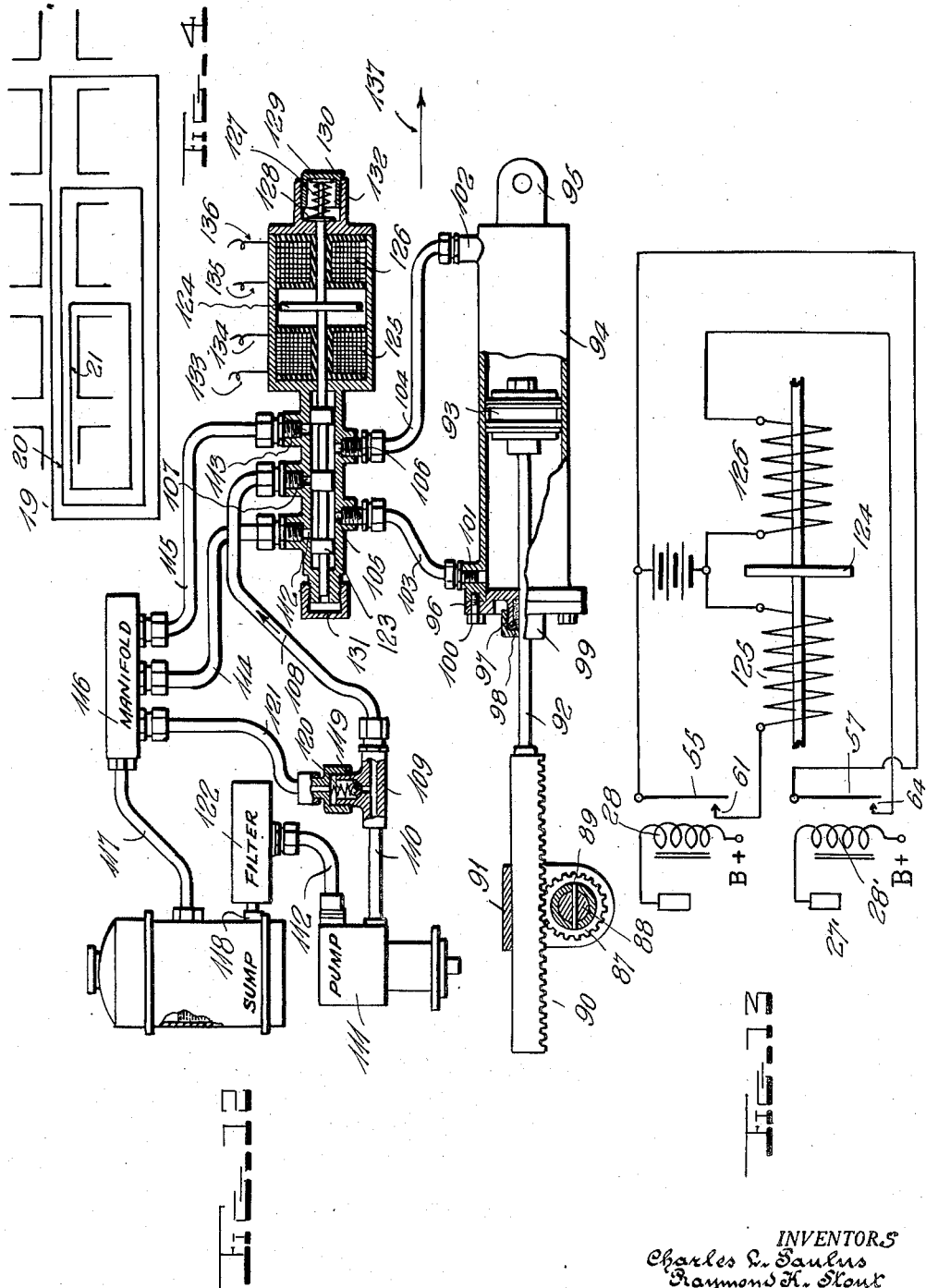

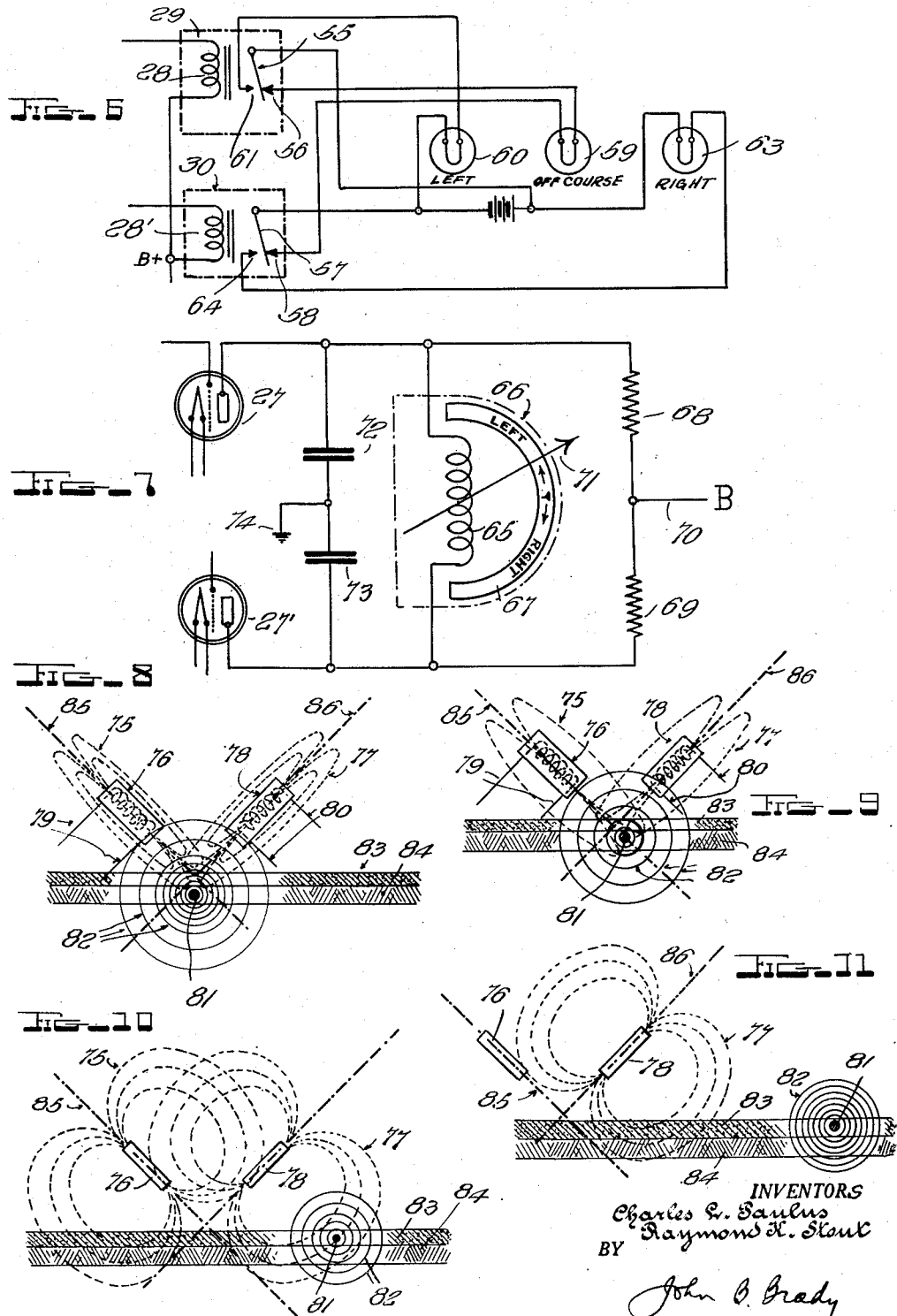

2,339,291

UNITED STATES PATENT OFFICE 2,339,291

AUTOMATIC STEERING MECHANISM

Charles L. Paulus and Raymond K. Stout, Dayton, Ohio, assignors of one-half to John B. Brady, Washington, D. C.

Application April 22, 1940, Serial No. 331,042

14 Claims. (Cl. 177—352)

Our invention relates broadly to a method and apparatus for controlling the movement of mobile bodies and more particularly to an electrically operated signal and automatic steering mechanism for mobile bodies.

One of the objects of our invention is to provide a system for electrically controlling the movement of a mobile body according to a prearranged course.

Another object of our invention is to provide an electrical safety system of traffic control which is effective under conditions of "blackout" which have arisen incident to the war and wherein no lights are shown by the moving traffic.

Still another object of our invention is to provide a system of signal actuation and/or automatic steering control for a mobile body over a predetermined course having a high degree of accuracy and precision whereby the mobile body may be started from a position of rest, maneuvered through a series of sequential operations and restored to rest position without an occupant upon the mobile body.

A further object of our invention is to provide an arrangement of magnetic pick-up apparatus which defines a prearranged course of travel, correlated to a cable system in such manner that a mobile body carrying the magnetic pick-up apparatus may have signals automatically operated thereon and/or steering apparatus automatically functioned to enable the mobile body to accurately follow the course laid out by the cable system.

A still further object of our invention is to provide an arrangement of angularly disposed magnetic pick-up members carried by a mobile body and arranged in a differentially balanced electrical circuit effective to control steering mechanism and/or signal apparatus on a mobile body according to the coincidence of the apex of the angle formed by the axes of the magnetic pick-up members with the magnetic field of a correlated cable system which marks the course to be followed by the mobile body.

Our invention provides a mechanism for automatically steering a vehicle by prepositioning a guiding member and causing the vehicle to follow a predetermined path by use of a sensitive pick-up in conjunction with means acting upon the steering gear control by said pick-up.

The invention provides a device which will cause a moving object to travel on a predetermined course by following a preset wire or member, no physical contact being made with this member. The device may be adapted for use upon power operated lawnmowers, rakes, rollers, etc.,—any and all agricultural and farm implements:—any type of automobile or truck:—all types of aircraft (either when being taxied on the ground or in flight and approaching the landing field): boats and all types of seacraft:—In general the device is of value wherever a definite route of travel is repeated a great number of times or where it is desired to move a number of trucks or aircraft to a definite location during total darkness. The directing member or wire may be quickly positioned or removed, as it can be used when under or on the surface of the ground.

Other and further objects of our invention reside in the arrangement of electrical control circuit employed in the signal and control system and will be understood by reference to the accompanying drawings, in which:

Figure 1 diagrammatically shows an installation of a guiding member or wire employed for controlling a power operated lawnmower or farm implement; Fig. 2 shows a lay-out of the directing wire or cable used to guide traffic in opposite directions through city streets or along boulevards during "black-out" employing the principles of our invention; Fig. 3 shows the plan of an airfield and the use of a plurality of guiding members to properly position an airplane for take-off at night without the use of lights; Fig. 4 shows an arrangement of frequency selective cable circuits for controlling the movement of a mobile body carrying frequency discriminating pick-up means; Fig. 5 diagrammatically and schematically illustrates the electrical control circuit and magnetic pick-up system used on the mobile body which is to be controlled; Fig. 5a shows schematically the arrangement of the pick-up coils used in the system of our invention; Fig. 6 shows a signal circuit on the mobile body controlled by the electrical control circuit of our invention; and Fig. 7 shows an arrangement of indicator circuit which may be used in the system of our invention. Fig. 8 is a theoretical view of the magnetic pick-up coils and their relation to the directing cable where the coils' null axes intersect directly above the wire and therefore both coils are picking up an equal amount of energy which indicates an on-course position. Fig. 9 shows the pick-up coils displaced slightly to the left of the wire so that one coil has practically no pick-up and the other coil has maximum pick-up so that the wire position can be accurately determined; at this time the left-right indicator will show full scale deflection. Fig. 10 shows the directing cable out to one side but still in the field of one coil and out of the magnetic field of the other coil; in this position the left-right indicator still shows full scale deflection. Fig. 11 illustrates the pick-up coils off-course to the left so far that their field is out of the wire's magnetic field; at this time the indicator returns to zero and the red light lights. Fig. 12 shows one form of hydraulic or pneumatic system employed in connection with our automatic steering system; Fig. 13 is a schematic view of the actuating portion of the electrical control circuit that operates the hydraulic or pneumatic system of Fig. 12; Fig. 14 is a composite circuit arrangement of the control circuit, signal system and visual indicator; Fig. 15 is a schematic plan view showing the automatic steering mechanism of our invention applied to a vehicle; Fig. 16 is a side elevational view of the automatic steering mechanism applied to a vehicle as illustrated in Fig. 15; and Fig. 17 shows an anticipator arrangement of steering mechanism attachable to the mobile body for anticipating turns and changes in direction of movement in guiding the mobile body.

In the system of our invention the directing member may be energized by an alternating current or interrupted direct current or used as a normally inert body which influences or disturbs the field of the pick-up coils when close to them. The "feeler" or pick-up portion of the device may extend forward of the steerable wheel or wheels of the object or vehicle and indicates the direction of proper turn. The amplifier enlarges and delivers this signal to (a) a visual indicator, (b) a series of indicating lights, and (c) to the automatic steerer which actually turns the wheels. The prime object may be obtained by several different methods as will appear as the description progresses and it will be understood that our disclosure herein is to be considered in the illustrative sense and not in the limiting sense. For example, the simple use of the device to steer a truck might include only manual control by the driver, guided by an indicating meter, and/or signal lights in the dark; white, straight ahead; red, stop; yellow, turn right; green, turn left; which arrangement and use would be of no value on a power mower. On the other hand it might be desirable to equip the truck or aircraft with complete automatic control with or without meter or signal lights. Due to the fact that the automatic steerer pick-up will respond to any frequency of alternating current to which it is tuned, a plurality of circuits each having a constant frequency selected to work with a certain automatic steerer adjustment may be used to direct a number of vehicles to any one of a number of branch-off points and routes.

Various methods may be employed in laying the cable along the course to be followed by the vehicle. Where the cable is laid along a boulevard, suitable means may be employed for cutting a shallow trench in the boulevard, laying the cable therein and resurfacing the trench over the cable.

Our invention has particular application to the control of traffic along boulevards wherein precision movement of vehicles in opposite directions and along adjacent lanes may be controlled by cable laid in the boulevard and coacting with the follow-up devices carried by vehicles in accordance with our invention. This eliminates errors in vehicle operation due to misjudgment of position of marking lines now employed on boulevards and enables vehicle drivers to precisely follow the proper course in a given lane by observing the indicator lights directly upon the dashboard of the vehicle in installations where the guiding is manually controlled or permits automatic control of the vehicles using the coacting follow-up device of our invention carried by the vehicle.

Referring to the drawings in detail, we have shown in Fig. 1 a prearranged course for controlling the movement of a power operated lawnmower for the purpose of illustrating the principles of our invention. A conventional property layout might include garage 1, drive 2, sidewalk line 3, sidewalk 4, house 5, shrubbery 6, 7 in which case a mower guiding wire might be laid just under the sod as indicated by the heavy line 8. It will be noted that this line forms a continuous circuit starting from the garage and returning to the same point. The only restrictions in laying the wire are to provide curves within the turning radius of the mower and to approach a right angle at all points of intersection of the cross overs.

Referring to Fig. 2, it will be noted that a guide wire 9 is carried to the right on street 10 and crosses over to return on street 11 to complete a circuit of travel through city streets during black-out.

Referring to Fig. 3, it will be noted that hangar 12 is located in the corner of boundary 13 of a flying field 14, guiding wires 15, 16, 17, 18 are carried to the four corners of the field, end with a turnout which will head the airplane in proper direction and place it in proper position for take-off without use of lights during black-out. It will be noted that the use of automatic steerer in this case makes it possible to maneuver an airplane in proper position for take-off without crossing the center of field, thereby maintaining an open space for aircraft landings.

Fig. 4 shows a plan of an arterial highway with a number of cross streets. The circuit 19 may carry 60 cycle alternating current, circuit 20 may carry 400 cycle alternating current and circuit 21 may carry 800 cycle alternating current. By this arrangement an automatic steerer tuned to any one of these frequencies will follow the path of its particular circuit and will not be disturbed by the others.

Referring to Fig. 5 only one side of the dual channel amplifier will be described, although both are shown in the drawing and corresponding parts are indicated by primed reference characters. The pick-up coil 22 is a high impedance soft iron core coil which is tuned to resonance by condenser 23. The energy or electromotive force in the coil is conducted through transmission line 24 to the grid of the dual triode high gain amplifier tube 25. The grid and plate resistors, cathode networks and by-pass condensers of this tube are of conventional design and are illustrated as generally at 26. After the signal is amplified in this tube, it is passed through the coupling condenser to the grid of the dual relay tube 27. When a signal is impressed upon the grid of this tube, it causes the plate to draw a comparatively large amount of current through relay coil 28, thereby actuating the plate current relay 29. The contacts of this relay and relay 30 are so connected that when no plate current is flowing through either relay, ignition switch 31 will short out the engine igniton system 32 by releasing bell-crank 33.

The spring operates relay armature 34 as well as bell-crank 33. If coil 28 is energized, it closes the corresponding contact which energizes coil 35 of power relay 36 so as to run motor 37 in one direction. In the event plate current relay 30 is energized, the power relay 38, having coil 39 and contacts 40 operates to run motor 37 in the opposite direction. The split field coil 41 is in series with armature 42. The filaments of the four tubes are illustrated at 43. Power supply for the system may be a battery 44 with a master switch 45. A vibrator type power supply is shown. The choke 46 and condensers 47 and 48 are for filtering the direct current after it has been rectified by tube 49. The vibrator 50 interrupts the flow of current, thereby causing a pulsating current which is stepped up to a high potential by power transformer 51 and then rectified by tube 49. The second channel contains corresponding parts leading to relay control windings 28' of relay 30. The cable which predetermines the path of the vehicle is indicated at 81 in line with a plane passing through the point of intersection of the axes of windings 22 and 22'.

In Fig. 5a we have shown the manner of mounting the pick-up coils which are diagrammatically shown in Fig. 5. A non-magnetic support is provided for the pick-up coils 22 and 22' as shown at 52 on which casings 53 and 54 are angularly mounted and which receive the pick-up coils on axes which are angularly disposed at approximately 90°. The cable with which coils 22 and 22' coact is shown below the point of intersection of the axes of the coils.

Other forms of coupling systems for the circuits of the amplifier may be provided and details are not material.

In Fig. 6 we have shown the circuit arrangement for distinctively colored—red, green and amber—indicator lights which may be carried aboard the mobile body for enabling the mobile body to be safely operated under black-out conditions. The relay coils are shown as 28 and 28'. When the coils are not energized, the arm 55 contacts point 56 and arm 57 contacts point 58, thereby energizing lamp 59. If coil of relay 29 is energized, it causes arm 55 to contact point 61, thereby lighting lamp 60. If coil of relay 30 is energized, the arm 57 contacts point 64 energizing lamp 63. If both coils are energized, lamps 63 and 60 both light. The lamp 59, by the action of the other lights before it lights, indicates: (1) off-course; (2) failure of source of power on guiding cable or break in cable; (3) failure of pick-up; (4) failure of amplifier.

In Fig. 7 we have shown a left and right hand indicator operated by the electrical control circuit of our invention. The electrode assemblies of tubes 27 and 27' connect to the pivotally mounted armature winding 65 of the visual indicating meter 66. The visual indicating meter 66 includes the pivotally mounted armature winding 65 which is angularly movable within the field of the permanent magnet 67. The plate circuits of the electrode assemblies 27 and 27' are completed through balancing resistors 68 and 69 to the source of plate potential connected at 70. For balanced condition of the branches of the pick-up circuit, an indicating pointer 71 carried by pivotally mounted armature 65 will remain in zero position. For conditions of unbalance, the indicator arm will move to left or right positions depending upon the condition of unbalance and provide a visual indication of the unbalanced condition. In order to permit the use of D. C. equipment and to avoid any condition of fluctuation of the indicator pointer 71, we provide condensers 72 and 73 connected to ground at 74, by which alternating current components are by-passed. This circuit arrangement avoids hunting or chattering and enables the indicator arm to be stabilized in its movement and to provide an indication of the average condition of balance in the circuits leading from the pick-up coils.

Figs. 8–11 show cross sections of the inductive pick-up coils and the wire laid in a road bed. Reference character 75 indicates the magnetic field of the left pick-up coil 76; and 77 is the magnetic field surrounding pick-up coil 78. 79 is the connection of the wire wound on coil 76 and 80 the electrical connection of coil 78. 81 represents the wire in the ground which is energized by an A. C. or pulsating current. The magnetic field 82 surrounds this wire. 83 is the road surface and 84 the gravel of the road bed. 85 is the center axis or null pick-up position of coil 76 and 86 is a similar center axis or null position of coil 78.

In Fig. 8 the coils' center axes intersect directly above the wire and therefore both coils are picking up an equal amount of energy which indicates an on-course position.

Fig. 9 shows the coils displaced slightly to the left of the wire so that coil 76 has practically no pick-up and coil 78 has maximum pick-up so that the wire position can be accurately determined. At this time the left-right indicator will show full scale deflection.

Fig. 10—This figure illustrates the wire out to one side but still in inductive relation to coil 78, although relatively ineffective with respect to coil 76. In this position, the left-right indicator is still at full scale deflection. Thus, a large range of movement for full scale deflection is afforded while the indicator retains a very sensitive on-course position.

Fig. 11—This figure illustrates the pick-up coils off-course to the left so far that they are substantially unaffected by the wire's magnetic field. At this time the indicator returns to zero and the red lamp lights.

Fig. 12 shows a diagrammatic view in partial section showing arrangement of parts and piping for use of hydraulic or pneumatic system with our automatic steering device.

Observing this figure, the spur gear 87 is attached to the steering column 88 by use of the pin 89. The rack 90 is held in proper relationship with spur gear 87 by the guide 91 which is journaled on the steering column 88. By this arrangement longitudinal movement of the rack will impart rotary motion to the steering column. The piston rod 92 connects the piston 93 and the rack 90. The cylinder 94 may be mounted by use of trunnion hole 95. The cylinder cap 96 contains the packing 97, the packing ring 98 and the packing nut 99 and is mounted by use of the cap screws 100. This provides an adjustable, oil tight gland around the piston rod. Oil is admitted or scavenged through the openings 101 and 102.

High pressure tubes 103 and 104 are used to connect ports 105 and 106 to the cylinder. The inlet port 107 is connected by tube 108 to relief valve 109 while tube 110 connects said relief valve to the output opening of high pressure pump 111. The pump may be driven by the main source of power (vehicle engine) or by separate motor. The low pressure or return ports 112 and 113 connected by tubes 114 and 115 to manifold 116 which is connected by tube 117 to sump tank 118. The relief valve 109 contains the ball 119 which raises when the pressure overpowers spring 120 allowing the excess to return to sump through tube 121. The pump 111 is fed through tube 112 from filter 122 which is connected to sump. The balanced oil valve assembly contains the plunger 123 which has an armature 124 positioned between the coils 125 and 126. The spring 127 with the washers 128 and 129 and the cap 130 function to hold the plunger and armature in the neutral position. The lower end of the valve is closed by cap 131 and the upper by cap 132. Electrical connection to the coils is made through pigtails 133, 134, 135 and 136.

The balanced oil valve is shown in the neutral position which will allow the piston 93 to be moved by rotation (manual) of the steering column 88 as the oil is free to circulate through ports 105 to 112 and 106 to 113. If the valve plunger 123 is moved to the right (in direction of arrow 137) port 112 will be closed and port 107 opened, thus applying pressure to port 105 and permitting return through ports 106 to 113.

In Fig. 13 we have shown the manner of connecting the solenoids 125 and 126 in the relay control circuit so that the differential operation of the amplifier system will control the position of the relays and correspondingly control energization of the solenoids 125 and 126. The relay coils are indicated at 28 and 28' controlling contacts 61 and 64 which control the energization of the solenoids and the movement of the armature 124 as indicated.

While we have shown one of the preferred circuit arrangements for controlling a hydraulic system in Fig. 13, it will be understood that other forms of circuits may be employed and that the circuit arrangement shown should be considered as one example of the form of control circuit we may employ.

In Fig. 14 we have shown a composite form of control circuit and visual indicating circuit in which control relays 29 and 30, having windings 28 and 28' connected in the output circuits of tubes 27 and 27' control relay arms 55 and 57 operating with respect to front and back contacts 61, 56 and 64, 58, respectively. We have shown the indicator lights 59, 60 and 63 controlled in the manner explained in connection with Fig. 6 and in addition we have shown the manner in which the hydraulic valve system is controlled through the connection of solenoid windings 125 and 126 in shunt with circuits extending from the relay contacts to the indicator lights 60 and 63 as shown. The indicator lights are distinctively colored red, green and amber as heretofore explained and show visually the different positions of the point of intersection of the pick-up coils with respect to the line of direction of the cable. The off-course indicating light 59 is included in a circuit involving an auxiliary solenoid control 138 operating upon armature 139 and which may function in various controls on the vehicle. In addition to the visual indicator lights 59, 60 and 63, we provide the left-right indicator 66 in circuit with tubes 27 and 27' for indicating the approach of the mobile body to the line of direction of the cable. The circuit will function with one or more of the indicating devices and control devices in the circuits. That is, the circuits will work with the indicators in or out of the circuits, or the control and safety solenoids in or out of the circuits, or with any combination of the control solenoids and indicating devices.

The guide mechanism functioned by the hydraulic valve, controlled by the movement of armature 124, may be associated with the steering mechanism of a mobile body or vehicle in a variety of ways.

Figs. 15 and 16 show one manner in which the hydraulic mechanism controls the steering mechanism of a vehicle having a conventional chassis supporting a body structure 140 on wheels 141 connected through axle 142 and mounted for proper angular movement on king pins 143 in the conventional manner. The conventional steering knuckles are provided for each wheel and steering knuckle arms 144 are interconnected by the steering knuckle tie rod 145. Movement is imparted to both of the steering knuckle arms by lever 146 so that the wheels 141 turn in unison. The steering gear rod 147 connects with lever 146 and extends from the worm and worm wheel shaft assembly shown generally at 148. Movement of rack 90 imparts rotation to pinion 87 moving steering gear shaft 88 for correspondingly operating the worm and worm wheel shaft assembly 148. The chassis extends forwardly as indicated at 149 and provides mounting means for front bumper 150. A frame 151 is mounted on the front bumper and serves as a support for the non-magnetic member 52 and non-magnetic casings 53 and 54 of the pick-up coil assembly. The amplifier equipment may be carried in a casing conveniently located at 152 on support 151 with leads interconnecting the solenoid mechanism which is mounted adjacent the hydraulic control mechanism indicated generally at 94. Fig. 16 shows the manner in which the pick-up coils follow the magnetic field of the buried cable 81 with the intersection of the axes of the pick-up coils indicated directly over the cable.

In Fig. 17 we have shown an arrangement of anticipator which is particularly useful in guiding the mobile body around curves or corners. In this arrangement the non-magnetic support 52 for the pick-up coil assembly is mounted on an arm 153 which is journaled centrally of the forward portion of the vehicle indicated generally at 154. A short lever 155 which may form a crank arm extension of lever 153 extends from journal 154 and is connected through link 156 to one of the steering knuckle arms 144. To properly support the weight of the pick-up coils, a pneumatically tired wheel may be mounted directly beneath the member 52 serving as an additional support for the pick-up coil assembly. Inasmuch as lever 153 may swing from side to side in following the magnetic field of the cable, the response of the vehicle in negotiating turns and in rounding corners is more accurate and precise than in the arrangement illustrated in Figs. 15 and 16. One dotted line position for the several associated parts is illustrated by correspondingly primed characters. The course of the vehicle for full line position of the parts is indicated by arrow 157 while the modified course of the vehicle controlled by the anticipator pick-up is represented by the set of arrows 158. Various modifications may be made in the arrangement of mechanical linkages and in the assembly of the steering mechanism and associated control mechanism.

Reverting to Fig. 5 we have shown one method of shutting down the operation of the prime mover, that is, by shunting the ignition system. This arrangement has been illustrated wholly for the purpose of simplifying explanation of the invention and it will be understood that we intend lever 33 to be capable of operating a switch to open the circuit to the ignition system for the purpose of stopping the engine. For starting the engine, we may employ a solenoid-operated switch such as solenoid 138 in Fig. 14.

We have referred to the use of red, amber and green lights as indicators. It will be understood that any suitable color arrangement may be selected to designate different conditions and no limitations upon the arrangement are intended. We have referred to the following of the cable by the correspondence of a point of intersection of the axes of the magnetic windings in the plane of the cable. It will be understood that such point of intersection may fall either above or below the cable, the important consideration being that such point of intersection fall within the vertical plane of the cable to insure precise and accurate guiding of the mobile body.

We fully realize that modifications may be made in the arrangement of the mechanical parts and the circuits of our invention and we desire that it be understood that no limitations upon our invention are intended other than may be imposed by the scope of the appended claims.

What we claim as new and desire to secure by Letters Patent of the United States is as follows:

1. In a traffic control system, a conductor defining a traffic lane and establishing a prearranged magnetic field marking the lane, apparatus carried by a vehicle comprising a pair of angularly disposed magnetic systems which have their axes intersecting in a point normally located between said conductor and said magnetic systems and normally in vertical alignment with said conductor during movement of the vehicle along the traffic lane, independent amplification channels connected with the respective magnetic systems and terminating in separate output circuits, and means common to said output circuits for visually indicating the relative lateral position of the point of intersection of the axes of said magnetic systems with respect to said conductor.

2. In a traffic control system, a conductor defining a traffic lane and establishing a prearranged magnetic field marking the lane, apparatus carried by a vehicle comprising a pair of angularly disposed magnetic systems which have their axes intersecting in a point normally disposed between said conductor and said magnetic systems and normally in vertical alignment with said conductor during movement of the vehicle along the traffic lane, independent amplification channels connected with the respective magnetic systems and terminating in separate output circuits, separate relays connected with said output circuits, and indicator means operated by said relays for indicating the relative lateral position of the point of intersection of the axes of said magnetic systems with respect to said conductor.

3. In a traffic control system, an electrically energized conductor defining a traffic lane and establishing a prearranged magnetic field marking the lane, apparatus carried by a vehicle comprising a pair of angularly disposed magnetic systems which have their axes intersecting in a point normally disposed between said conductor and said magnetic systems and normally in vertical alignment with said conductor during movement of the vehicle along the traffic lane, independent amplification channels connected with the respective magnetic systems and terminating in separate output circuits, separate means connected in common with said output circuits for indicating the relative lateral position of the point of intersection of the axes of said magnetic systems with respect to said conductor, and independent means connected with said output circuits for indicating the movement of the point of intersection of the axes of said magnetic systems toward or away from vertical alignment with said conductor.

4. In a traffic control system, an electrically energized conductor defining a traffic lane and establishing a prearranged magnetic field marking the lane, apparatus carried by a vehicle comprising a guiding mechanism, a pair of angularly disposed magnetic systems having their axes intersecting in a point normally disposed between said conductor and said magnetic systems and normally maintained by the operation of said guiding mechanism in vertical alignment with said conductor during movement along the traffic lane, independent amplification channels connected with the respective magnetic systems and terminating in separate output circuits, and means common to said output circuits for controlling the operation of said guiding mechanism according to the position of the point of intersection of the axes of said magnetic systems laterally with respect to said conductor.

5. In a traffic control system, an electrically energized conductor defining a traffic lane and establishing a prearranged magnetic field marking the lane, apparatus carried by a vehicle comprising a guiding mechanism, a pair of angularly disposed magnetic systems having their axes intersecting in a point normally located between said conductor and said magnetic system and normally maintained by the operation of said guiding mechanism in vertical alignment with said conductor during movement along the traffic lane, independent amplification channels connected with the respective magnetic systems and terminating in separate output circuits, means common to said output circuits for visually indicating the relative lateral position of the point of intersection of the axes of said magnetic systems with respect to said conductor, and means connected with said output circuits for simultaneously controlling said guiding mechanism for maintaining the vehicle in a course determined by said conductor.

6. In a traffic control system, an electrically energized conductor defining a traffic lane and establishing a prearranged magnetic field marking the lane, apparatus carried by a vehicle comprising a guiding mechanism, a pair of angularly disposed magnetic systems having their axes intersecting in a point normally disposed between said conductor and said magnetic systems and normally maintained by the operation of said guiding mechanism in vertical alignment with said conductor during movement along the traffic lane, independent amplification channels connected with the respective magnetic systems and terminating in separate output circuits, means common to said output circuits for indicating the relative lateral position of the point of intersection of the axes of said magnetic systems with respect to said conductor, independent means connected with said output circuits for indicating the movement of the point of intersection of the axes of said magnetic systems toward or away from vertical alignment with said conductor, and means connected with said output circuits for simultaneously controlling the operation of said guiding mechanism for maintaining the vehicle in a course determined by said conductor.

7. In a traffic control system, an electrically energized conductor defining a traffic lane and establishing a prearranged magnetic field marking the lane, apparatus carried by a vehicle comprising a prime mover, an orientable guiding mechanism for the vehicle, a pair of angularly disposed magnetic systems having their axes intersecting in a point normally disposed between said conductor and said magnetic systems and normally maintained by the operation of said guiding mechanism in vertical alignment with said conductor during movement along the traffic lane, independent amplification channels connected with the respective magnetic systems and terminating in separate output circuits, means controlled by said output circuits for visually indicating the relative lateral position of the point of intersection of the axes of said magnetic systems with respect to said conductor, and means connected with said output circuits for simultaneously controlling the operation of said prime mover and the orientation of said guiding mechanism for maintaining the vehicle in a course determined by said conductor.

8. In a traffic control system, an electrically energized conductor defining a traffic lane and establishing a prearranged magnetic field marking the lane, apparatus carried by a vehicle comprising a prime mover, an orientable guiding mechanism for the vehicle, a hydraulic actuator for said orientable guiding mechanism, a pair of angularly disposed magnetic systems having their axes intersecting in a point normally disposed between said conductor and said magnetic systems and normally maintained by the operation of said guiding mechanism in vertical alignment with said conductor during movement along the traffic lane, independent amplification channels connected with the respective magnetic systems and terminating in separate output circuits, means controlled by said output circuits for visually indicating the relative lateral position of the point of intersection of the axes of said magnetic systems with respect to said conductor, means cooperative with the last said means for simultaneously controlling the operation of said prime mover, and means also controlled by said output circuits for controlling the operation of said hydraulic actuator for correspondingly governing the movement of said orientable guiding mechanism for maintaining the vehicle in a course determined by said conductor.

9. In a guiding system for vehicles, in combination with an angularly shiftable guide means, a controller for said guide means, a conductor of electrical energy marking a prearranged course for vehicles and means carried by the vehicles for following the prearranged course comprising a control member connected with and extending ahead of said angularly shiftable guide means, a dual channel energy pick-up circuit having individual input circuits and a common output circuit, energy pick-up means carried by said control member in inductive relation to said conductor and connected with said individual input circuits, connections between said common output circuit and said controller, said dual channel energy pick-up circuits being normally balanced to receive substantially equal amounts of control energy from said conductor through said pick-up means, and being operative upon relative lateral displacement of said energy pick-up means for effecting operation of said controller and correspondingly actuating said angularly shiftable guide means for maintaining said vehicle in a course substantially corresponding to the course of said conductor of electrical energy, said control member being effective to position said pick-up means ahead of said guide means for transmitting control energy to said controller for causing said guide means to follow the true course of said conductor.

10. In a pick-up system for an automatic steering device, a plurality of tuned inductance coils adapted to be energized by the field of a guiding cable; said coils being mutually disposed at such an angle that the axes of the coils intersect in a point vertically displaced from the position of said cable a fraction of the distance between the cable and said inductance coils.

11. In a steering system for vehicles, an electrically energized cable for establishing a magnetic field defining a prearranged course, coacting control means carried by a vehicle for controlling the course of the vehicle with respect to the cable, propelling mechanism operative for driving the vehicle, and means operated by said control means upon a termination of the coaction of said cable and said control means for terminating the operation of said propelling mechanism.

12. A horizontal steering system including an electrically energized conductor arranged in definition of a prearranged course, and means for receiving energy from said conductor including selectively tuned coil antennas relatively positioned so that their axes intersect at a point normally located between the conductor and said coil antennas, a differential electron tube relay for amplifying the energy received through said dual antennas, and a responsive horizontal-steering control device activated by the amplified energy.

13. An automatic steering system for vehicles for substantially instantaneous change of course with change in direction of the guiding element, comprising an electrically conductive guiding element arranged in definition of a prearranged course and disposed substantially uniformly with respect to a vehicle movable along said course; and coacting follower means mounted on the vehicle including dual responsive elements directionally related to said guiding element on opposite sides of the vertical plane through the cable and disposed in planes that intersect in a point which is normally located between the guiding element and the dual responsive means and normally producing balanced control factors, and differential steering control means energized by said control factors, the directional relationship of said dual responsive elements to said guiding element being such that the balanced control factors normally produced in said dual responsive elements are substantially less in each element than the maximum obtainable, and the magnitude of one control factor being substantially increased and the magnitude of the other control factor being reduced to substantially zero upon a predetermined limited off-course relationship of the vehicle, for producing a relatively large differential control factor for operation of said differential steering control means for substantially instantaneously changing the course of the vehicle to reestablish balanced control factors.

14. An automatic steering system for vehicles for substantially instantaneous change of course with change in direction of the guiding element, comprising an electrically energized cable arranged in definition of a prearranged course and disposed substantially uniformly with respect to a vehicle movable along said course; and coacting follower means mounted on the vehicle including dual induction coils arranged with their axes intersecting at a point normally adjacent said cable in vertical alignment therewith for producing balanced control voltages, and differential steering control means energized by said control voltages, the balanced control voltages normally produced in said induction coils being substantially less in each coil than the maximum obtainable, and the magnitude of one voltage being substantially increased and the magnitude of the other voltage being reduced to substantially zero upon a predetermined limited off-course relationship of the vehicle for producing a relatively large differential voltage for operation of said differential steering control means for substantially instantaneously changing the course of the vehicle to reestablish balanced control voltages.

CHARLES L. PAULUS.
RAYMOND K. STOUT.